Figure 1:
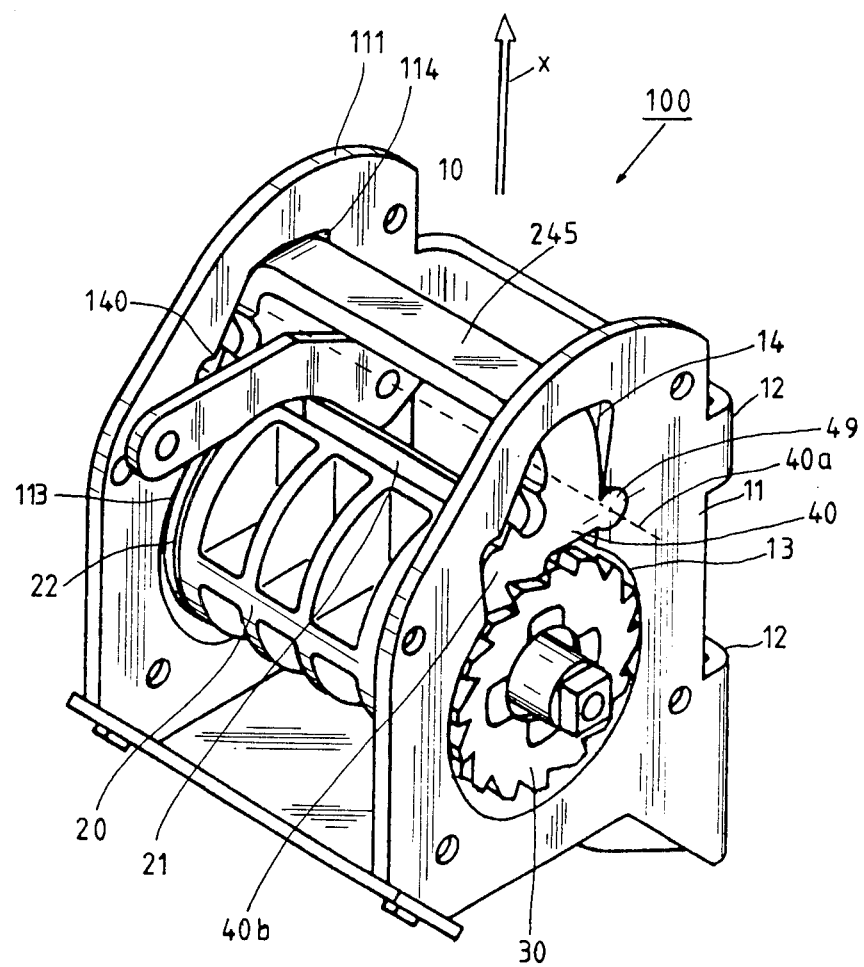

United States Patent [19]

Essler

[11] Patent Number: 4,619,419
[45] Date of Patent: Oct. 28, 1986

[54] APPARATUS FOR THE AUTOMATIC ROLLING UP OF A VEHICLE SAFETY BELT

[75] Inventor: Karl H. Essler, Tornesch, Fed. Rep. of Germany

[73] Assignee: Autoliv GmbH, Elmshorn, Fed. Rep. of Germany

[21] Appl. No.: 703,739

[22] Filed: Feb. 21, 1985

[30] Foreign Application Priority Data

Feb. 21, 1984 [DE] Fed. Rep. of Germany ... 8405545[U]

[51] Int. Cl.$^4$ .................. B60R 22/38; B60R 22/40
[52] U.S. Cl. .................. 242/107.4 A; 242/107.4 B
[58] Field of Search .............. 242/107.4 A, 107.4 R, 242/107.4 B, 107.4 C, 107.4 D, 107.4 E; 280/806; 297/478

[56] References Cited

U.S. PATENT DOCUMENTS 3,917,188 11/1975 Nilsson ................ 242/107.4 A
4,150,799 4/1979 Takada ................ 242/107.4 A
4,307,852 12/1981 Seifert et al. ......... 242/107.4 A
4,422,594 12/1983 Honl ..................... 242/107.4 A
4,509,707 4/1985 Ernst et al. ........... 242/107.4 A Primary Examiner—John M. Jillions
Attorney, Agent, or Firm—Toren, McGeady, Stanger, Goldberg & Kiel

[57] ABSTRACT

For leading off the forces acting when tension is exerted on the safety belt and with the pawl (40, 140) engaging in the external teeth (31) of the ratchet wheel (30) in the frame (10) receiving the belt shaft (20), pawl (40, 140) located in the opening (14, 114) following on to the ratchet wheel opening (13, 113) is pivotable at one end about an axis (40a) parallel to the belt shaft and is held with a clearance in the opening is provided at its end (40b) remote from the pawl fulcrum with a force flux transfer surface which is supported on the mating surface of the opening (14, 114) when tensile forces act on the belt and in the engagement position.

3 Claims, 5 Drawing Figures

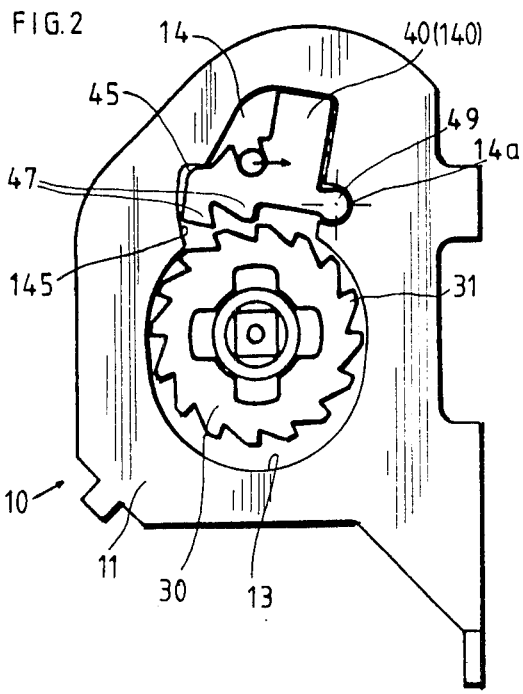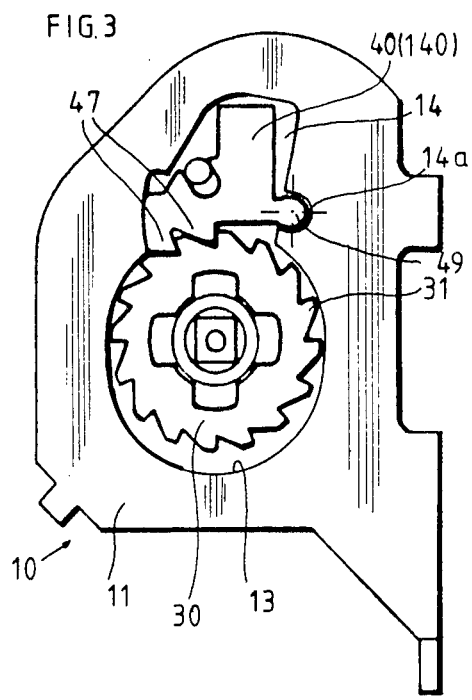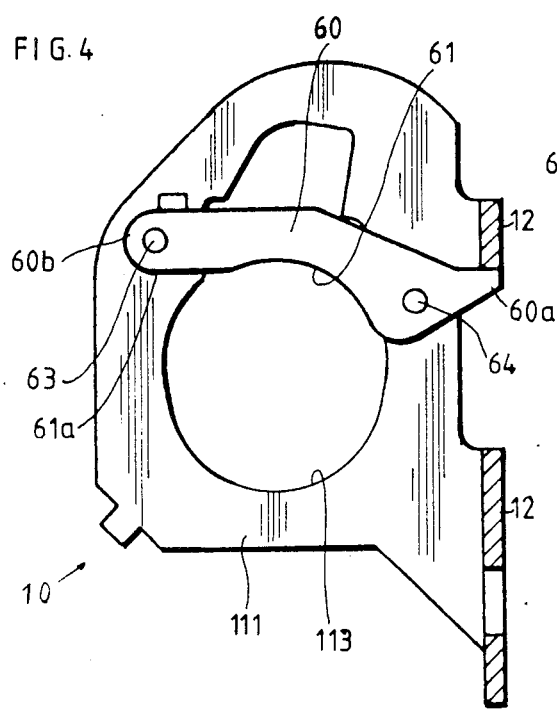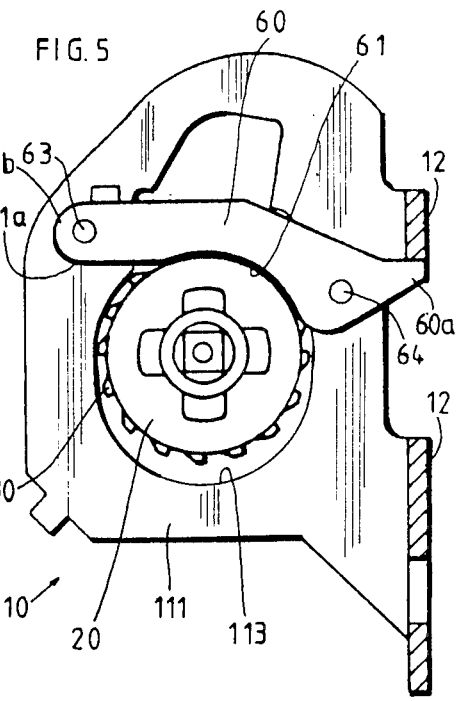

APPARATUS FOR THE AUTOMATIC ROLLING UP OF A VEHICLE SAFETY BELT

The present invention relates to an apparatus for the automatic rolling up of a vehicle safety belt, comprising a casing consisting of a U-shaped frame with openings formed in its side plates for a belt shaft held in rotary manner therein for winding up the extractable belt and which at one or both ends carries in each case a ratchet wheel cooperating with the belt shaft, which is positioned in the opening and located in the plane formed by the outer wall surface and the inner wall surface of the frame side plate, the external teeth of said ratchet wheel being engageable with a retaining pawl located in an opening following on to the opening receiving the ratchet wheel when tension is exerted on the belt.

The most varied constructions are known for belt roll-up devices for vehicle safety belts with locking mechanisms. Thus, DE-OS No. 24 35 050 describes a belt roll-up device for motor vehicle safety belts with a rotary shaft for winding up the extractable belt, as well as with a locking device for preventing the further extraction of the belt, with at least one locking member which, on exceeding a given angular acceleration of the shaft and/or acceleration of the vehicle can be brought into a locking position in contact with an opposite member fitted to the casing. In the case of this belt roll-up device, the locking device is constructed as a safety catch with locking means having teeth. For putting on the seat belt, it can be drawn off the winding reel in opposition to a roll-up spring, the spring exerting a tension on the belt, so that this does not engage on the body. In the case of an accident, the roll-up device shaft is locked, so that at such time the belt cannot be pulled out.

It is known to use a locking pawl means as a locking mechanism to prevent further extraction of the belt, in which the pawl engages in the external teeth of a ratchet wheel, which is arranged on the belt shaft and cooperates therewith. In the case of the known belt roll-up devices, the ratchet wheels are arraned within the side plates of the frame-like casing of the roll-up device. However, this arrangement does not enable the casing or frame of the belt roll-up device to adequately absorb the supporting forces.

It is common to all known safety belt roll-up devices, that their belt shafts are exposed to considerable tensile stresses by the belt and are nor adequately secured against axial displacement in the frame receiving the same, so that the retaining pawls frequently do not engage sufficiently securely in the external teeth of the ratchet wheels and remain in the engaged position. In addition, when tensile loading takes place through the belt, the resulting forces are absorbed by the swivel bearing of the pawl, so that adequate security for the engagement of the pawl in the external teeth of the ratchet wheel is not provided. In addition, the known pawls have a considerable length, so that strength and stability problems occur, particularly if the pawl is exposed to high forces.

The problem of the invention is to provide a locking system for the belt shaft, in which the forces acting when tension is exerted on the belt in the case of a pawl engaging in the external teeth of the ratchet wheel are led off into the frame receiving the belt shaft and are absorbed by said frame, whilst ensuring increased engagement security of the pawl in the external teeth of the ratchet wheel.

According to the invention this problem is solved by an apparatus for the automatic rolling up of a vehicle safety belt, wherein the retaining pawl located in the opening following on to the ratchet wheel opening and pivotable at one end about an axis parallel to the belt shaft and held in said opening with a clearance is externally provided on its end remote from the pawl fulcrum with a force flux transfer surface, which is supported on a mating surface of the opening when tensile forces act on the belt and in the engagement position.

As a result of a retaining pawl constructed in this way with a force flux transfer surface, which cooperates with a mating surface in the vicinity of the opening, in which the pawl is pivotably mounted, it is possible to mount the pawl in the opening in the side plates of the frame-like casing in a low friction, toleranced manner prior to engagement. If the belt is stressed under the action of tension, the clearance is reduced to zero, so that the free end of the pawl is supported on the side plate of the casing frame, so that the actual casing absorbs the forces acting on the pawl. Thus, the force path is very short and no bending problems can occur with respect to the pawl. In this way, any diversion of the forces acting on the pawl into the casing via the swivel bearing is avoided. The pawl bearing is thereby kept free from forces. However, when stressing takes place, the engagement security is increased, because the engagement of the pawl in the external teeth of the ratchet wheel is reinforced in that the latter rotates in the pawl teeth, so that a self-reinforcing action occurs when tensile forces act on the belt.

The pawl can be constructed so as to lock on one or both sides. Apart from the arrangement of a retaining pawl engaging in the external teeth of a ratchet wheel, it is also possible to provide two pawls, whereof each then engages in the external teeth of a ratchet wheel associated therewith. In this case, the two retaining pawls are advantageously interconnected by a bow-shaped member.

Further advantageous constructions of the invention can be gathered from the subclaims.

The invention is described in greater detail hereinafter relative to non-limitative embodiments and the attached drawings are as follows:

FIG. 1 a perspective view showing the casing of a safety belt roll-up device with the belt shaft and the locking mechanism comprising the ratchet wheels and the pawls.

FIG. 2 a side view of the casing prior to the engagement of the pawl in the external teeth of the belt shaft ratchet wheel.

FIG. 3 a side view of the casing with the pawl engaging in external teeth of the belt shaft ratchet wheel.

FIG. 4 an inside view of a side plate of the casing with the belt shaft removed and with a supporting and securing element for the belt shaft.

FIG. 5 an inside view of the embodiment according to FIG. 4 with the belt shaft with ratchet wheel inserted in the casing side plate opening.

According to FIG. 1, the safet belt roll-up device 100 comprises a casing 10 consisting of a U-shaped frame with the two frame side plates 11, 111 which are interconnected by means of rearward webs 12.

An opening 13, 113 is provided in each of the two frame side plates 11, 111. Each of the openings 13, 113 in the side plates 11, 111 opens to another opening 14, 114 in the side plates, to which further reference will be made hereinafter.

Openings 13, 113 of casing 10 hold a belt shaft 20, which is mounted in rotary manner in said openings and which in per se known manner has a slot 21 extending along the belt axis and through which the belt shaft 20 is radially drawn, and to which is fixed the free end of a safety belt, which is e.g. made from a textile material and which is not shown in the drawing. The belt drawout direction is indicated by the arrow X in FIG. 1.

The two frame side plates 11, 111 are kept precisely spaced from one another by means of the webs 12 acting as spacers. Further elements, such as roll-up springs and the like are not shown in the drawings.

At both of its ends, the belt shaft 20 carries ratchet wheels, whereof FIG. 1 only shows one ratchet wheel 30. The ratchet wheels 30 arranged on the ends of belt shaft 20 are mounted thereon in such a way that the ratchet wheels are in operative connection with the belt shaft. The ratchet wheels 30 are arranged in such a way that they come to rest in the openings 13, 113 in the two frame side plates 11, 111. The ratchet wheels are fixed to the belt shaft 20.

In its two end regions, the belt shaft 20 can also have end plates 22, which are positioned in front of the ratchet wheels 30 so that end plates 22 are positioned alongside the inner side walls of frame side plates 11, 111 of casing 10 (FIG. 1). In place of the end plates 22, belt shaft 20 can be provided with shaped, all-round collars. Whereas the end plates or collars 22 are fixed to belt shaft 20, the ratchet wheels arranged on the latter are held on end portions thereof in such a way that the rotatability of belt shaft 20 can be stopped by the ratchet wheels 30.

Openings 14, 114 for receiving retaining pawls 40, 140 are provided above the openings 13, 113 for ratchet wheels 30 in frame side plates 11, 111. The pawls can be interconnected by means of a bow-shaped member 245 and at one end can be pivotable about horizontal axes 40a in or on frame side plates 11, 111. For the purpose of pivoting the pawls about the horizontal axes 40a, swivel bearings are provided which are constituted by pitch circular recesses or pawl bearings 14a in frame side plates 11, 111 in the vicinity of openings 14, 114 and in which engage correspondingly formed counterparts 49, which are shaped on the ends of pawls 40, 140 (FIGS. 1, 2 and 3).

The free front ends 40b of pawls 40, 140 have engagement teeth 47, in order to bring about an engagement of pawls 40, 140 in the external teeth 31 of ratchet wheels 30 for the purpose of the locking function (FIG. 3).

The front free end 40b of each pawl 40, 140 has a force flux transfer surface 45 guided as a radius about the pawl fulcrum and which is supported on a mating surface 145 of opening 14, 114, when the engagement teeth 47 of pawls 40, 140 engage in the external teeth 31 of ratchet wheels 30 (FIG. 3). This mating surface 145 is constructed in such a way or runs towards the pivoting area of the front end 40b of pawl 40, 140 in such a way that the flux force transfer surface 45 of pawl 40, 140 is only supported on the mating surface 145 (FIG. 3) when pawl 40, 140 is engaged in the external teeth 31 of ratchet wheel 30, whereas in the position in which the pawl 40, 140 does not engage in external teeth 31 of ratchet wheel 30, pawl 40, 140 is freely movable, i.e. the flux force transfer surface 45 thereof is then arranged with a clearance with respect to the mating surface 145 (FIG. 2). When the pawl 40, 140 is located out of engagement with the ratchet wheel 30, the position control mechanism (not shown) has an actuating pin 80 which effects the movement of the pawl into the ratchet wheel, so that the clearance is formed between the pawl and the casing when the pin 80 biases the pawl in the direction of the arrow X in FIG. 2. This clearance results from the clearance in the pawl bearing 14 and the pressure of the actuating pin of the position control mechanism in the pawl released state. Both the flux force transfer surface 45 on pawl 40, 140 and the mating surface 145 in the vicinity of opening 14, 114 are formed with the same material thickness as pawl 40, 140 or the frame side plates 11, 111. It is possible to widen the mating surface 145 and the flux force transfer surface 45 compared with the wall thickness of pawl 40, 140 or frame side plates 11, 111.

The safety belt roll-up device 100 can only have a single pawl, which then cooperates with the external teeth of a ratchet wheel arranged on the belt shaft 20. However, it is advantageous for belt shaft 20 to have two ratchet wheels 30, which are located in the openings 13, 113 in frame side plates 11, 111 of caasing 10. Pawl 40 is constructed in the same way as pawl 140, an the two pawls 40, 140 act in the same way.

In the case of the position of pawl 40 shown in FIG. 2, its teeth have still not engaged in the external teeth 31 of the ratchet wheel 30. Only when the belt is stressed, is the belt shaft 20 locked by teeth 47 of pawl 40 engaging in the external teeth 31 of ratchet wheel 30 (FIG. 3) due to the displacement of the pawl 40 by the actuating pin 80, note the difference in position of the actuating pin 80 in FIG. 2 as compared to FIG. 3 where it has biased the pawl into meshed engagement with the ratchet wheel 30. In this position, the front end 40b of pawl 40 which has the flux force transfer surface 45 is supported on the mating surface 145 of opening 114.

In order to secure the belt shaft 20 against axial displacement and in order to be able to transfer the force flux from the belt shaft into casing 10 or its frame when the belt is stressed, the rod or plate-like supporting and securing element 60 is arranged on the inner wall surface of one of the two frame side plates 11, 111 of casing 10, it also being possible to arrange such a supporting and securing element 60 on each of the inner wall surfaces of the two frame side plates. The supporting and securing elements 60 are arranged in such a way that the belt shaft 20 or the end plates or all-round collars 22 provided on belt shaft 20 are supported on the lower edge 61a of each supporting and securing element 60 (FIG. 5). Preferably the area of the supporting and securing element 60 facing the belt shaft 20 or its end plates, collars, etc. 22 has a circular arc-shaped recess 61 having a diameter corresponding roughly to the diameter of the belt shaft 20 or its end plates, collars, etc. 22.

At 63, 64, each supporting and securing element 60 is fixed to the inner wall surface of each of the two frame side plates 11, 111 of casing 10. The length and arrangement of the supporting and securing elements 60 is such that said element is supported by at least one of its two ends on the casing 10 or the frame thereof, as can be gathered from FIGS. 4 and 5. End 60a of the supporting and securing element 60 is supported here on or below web 12, which interconnects the two frame side plates 11, 111. An additional and corresponding support can be provided in the vicinity of the front end 60b of the supporting and securing element 60, if corresponding support surfaces are provided at this point.

In order to prevent axial displacement of the belt shaft 20, the latter has a smaller diameter than that of the ratchet wheel or wheels 30 (FIG. 5). Due to the fact that ratchet wheel 30 has a larger diameter than belt shaft 20, the all-round edge of ratchet wheel 30 engages in the vicinity of the supporting and securing element 60, so that the supporting and securing element 60 provided on either side of the casing 10 prevent an axial displacement of belt shaft 20. However, if the belt shaft 20 has end plates or all-round collars 22 in its end region, then the diameter of said end plates or collars 22 is smaller than that of the ratchet wheels 30, so that belt shafts 20 with mounted end plates or shaped-on collars 22 are also secured against axial displacement by the supporting and securing elements 60. As a function of the belt extraction direction, the end plates or collars 22 are supported on the edges 61 of the two supporting and securing elements 60 of the inner wall surfaces of the frame side plates 11, 111 when belt stressing takes place.

In the case of the embodiment shown in FIGS. 4 and 5, the supporting and securing elements 60 are arranged on the inner wall surfaces of the two frame side plates 11, 111 of casing 10. In the case of a corresponding construction of belt shaft 20, it is also possible to arrange the two supporting and securing elements 60 on the outer wall surfaces of the frame side plates 11, 111. For this construction, terminal portions of belt shaft 20 are led out of the ratchet wheels 30. The free ends of belt shaft 20 can also carry end plates, whose diameter is smaller than that of the ratchet wheels 30 and which then are supported on the lower edges of the supporting and securing elements 60 fitted to the outer wall surfaces of the frame side plates 11, 111 of casing 10.

The supporting and securing elements 60 are fixed to the frame side plates 11, 111 of the casing by means of riveted, welded, adhesive or screw connections or by clips, i.e. in a positive or non-positive manner. However, the supporting and securing elements 60 can also be an integral part of the frame side plates 11, 111 if, as a function of the belt extraction connection, e.g. above belt shaft 20 or its end plates or collars 22, said plates have extracted portions, i.e. corresponding portions of the side plates 11, 111 are offset, so that a bearing edge 61 is obtained for supporting the belt shaft 20 or its end plates or collars 22. These offsets can be provided both on the inside and the outside of the frame side plates 11, 111 of casing 10. The direction of the offset which then represents the supporting and securing element will then depend on whether the belt shaft 20 is to be supported on said offsets or the supporting and securing elements formed by the inside casing 10 or outside the same.

The dimensions of the pawls are kept small, so that the mass during accelerated movement when the pawl is displaced into engagement with the ratchet wheel is small, so that low inertia forces are obtained. This leads to a limited loading of the plastic parts of the position control mechanism.

I claim:

1. Apparatus for the automatic rolling up of a vehicle safety belt, comprising a casing in the form of a U-shaped frame with said frame comprising a pair of spaced side plates interconnected by a web, said side plates each having an inside surface and an outside surface, each said side plate having a first opening extending therethrough, a belt shaft extending between and rotatably mounted about an axis extending through said first openings, at least one ratchet wheel secured to said belt shaft at one end thereof and said ratchet wheel being located between the planes formed by the inside and outside surfaces of one of said side plates, a locking pawl pivotally mounted in a second opening in said side plate containing said opening in which said ratchet wheel is located, said second opening being contiguous to and being open to said first opening containing said ratchet wheel, said ratchet wheel having teeth spaced circumferentially thereon, said locking pawl having a first end and a second end with the first end having a pivot axis disposed parallel to the axis of said belt shaft, wherein the improvement comprises that said second opening has a circular recess in the boundary surface thereof adjacent said first opening, said locking pawl has a bearing counterpart at the first end thereof pivotally mounted in said circular recess so that said pawl is pivotally displaceable as said bearing counterpart pivots in said circular recess about the pivot axis of said locking pawl between a first position with said locking pawl in meshed engagement with said teeth on said ratchet wheel and a second position with said locking pawl spaced out of engagement with said teeth on said ratchet wheel, said locking pawl comprises an angularly shaped plate member having a first leg of said plate member extending in the first end-second end direction of said locking pawl and a second leg extending transversely of said first leg, said first leg and second leg forming a junction facing away from said ratchet wheel, a bearing recess formed in said pawl at the junction, an actuating pin located in said recess for displacing said pawl between the first and second positions, said first leg at the second end of said locking pawl having a plurality of engagement teeth for engagement with said teeth on said ratchet wheel in the first position of said locking pawl, the end of said leg located at the second end of said locking pawl has a rectilinear surface extending transversely of the first end-second end direction of said locking pawl and extending from said engagement teeth at the second end of said lockiing pawl, said rectilinear surface forming a flux force transfer surface arranged to contact and be supported by a mating surface forming a boundary surface of said second opening adjacent to said first opening when said locking pawl is in the first position, said flux force transfer surface being displaced into contact with said mating surface when tensile force acts on the safety belt whereby said actuation pin acts on said locking pawl for displacing said locking pawl into the first position whereby the forces are absorbed by said casing and the pivot bearing for said pawl is free of the forces.

2. Apparatus, as set forth in claim 1, wherein one said ratchet wheel is located at each of the opposite ends of said belt shaft, and one said locking pawl is located in each of said side plates for effecting interlocking engagement with the respective one of said ratchet wheels, and a bow-shaped member extending transversely between said side plates and interconnecting said locking pawls.

3. Apparatus, as set forth in claim 1, wherein said locking pawl is formed to lock on one or both sides.

* * * * *